Jan. 30, 1968     T. J. GRUBER     3,366,240

LINE STRAINER INDICATING DEVICE

Filed July 14, 1965

INVENTOR
THOMAS J. GRUBER
BY
Teagno, Sadler & Tuddy
ATTORNEY

United States Patent Office 3,366,240
Patented Jan. 30, 1968

3,366,240
LINE STRAINER INDICATING DEVICE
Thomas J. Gruber, Chagrin Falls, Ohio, assignor to Eaton Yale & Towne Inc., a corporation of Ohio
Filed July 14, 1965, Ser. No. 471,892
5 Claims. (Cl. 210—90)

ABSTRACT OF THE DISCLOSURE

A line strainer including an indicating device or apparatus to detect the clogging of a filter element with contaminants. A differential in pressure between the inlet and outlet of the filter element acts on opposed faces of an indicator pin. A spring biased detent maintains the indicator pin in a neutral or no-indicating position. When the filter becomes clogged with contaminants, the differential in pressure between the filter inlet and outlet overcomes the force of the spring detent acting upon the indicator pin to thereby rapidly translate said pin to a position in which a portion thereof protrudes outwardly of the line strainer body to present an exterior visible indication that the filter is clogged.

---

The present invention pertains, generally, to a line strainer or filter indicating device or apparatus that is so constructed and arranged as to detect, sense or otherwise be responsive to clogging of a filter element with contaminents.

More particularly, this invention relates to a line strainer indicating device that is so constructed and arranged as to provide or present a signal when the strainer or filter element requires changing or replacement, having a pressure responsive assembly enabling the indicating device or apparatus to present the aforesaid signal in response to the differential pressure that prevails across the filter element.

Having in mind the foregoing, it will be understood that a primary object of the present invention is to provide an improved line strainer indicating device that is so constructed and arranged as to cause the filtration of various fluid mediums, such as oil and the like, said indicating device or apparatus comprising a visible indicator element to signal or indicate the condition of a filter element, and more particularly, to signal or indicate whether or not the filter has become clogged with contaminants to such an extent that the fluid mediums cannot readily be translated therethrough.

Another primary object of this invention, in addition to the foregoing objects, is to provide an improved line strainer indicating device or apparatus that is so constructed and arranged as to present a body or structure for containing a filtering medium, and is further so constructed and arranged as to be permanently operatively associated with a conduit or system of conduits requiring that the flow or translation of a fluid medium therethrough be filtered.

Yet another primary object of the present invention, in addition to each and every one of the foregoing objects, is to provide an improved line strainer indicating device or apparatus that is so constructed and arranged as to enable the ready removal and replacement of the filtering element with a minimum expenditure of time and effort, and without necessitating a disturbance of the connections that operatively associate the indicating device or apparatus with the system of conduits.

Furthermore, it is a primary object of this invention, in addition to each and every one of the foregoing objects, to provide an improved line strainer indicating device or apparatus that is so constructed and arranged as to enable a rapid response to clogging of a filter element with contaminants, and a substantially immediate actuation of a switch or switching mechanism in response thereto.

Other objects and important features of the present invention will be apparent from a study of the specification following taken with the drawing, which together show, illustrate, describe and disclose a preferred embodiment or modification of the invention, and what is now considered to be the best mode of practicing the principles thereof. Other embodiments or modifications may be suggested to those having the benefit of the teachings herein, and such other embodiments or modifications are intended to be reserved especially within the scope and spirit of the sub-joined claims.

Figure 1:
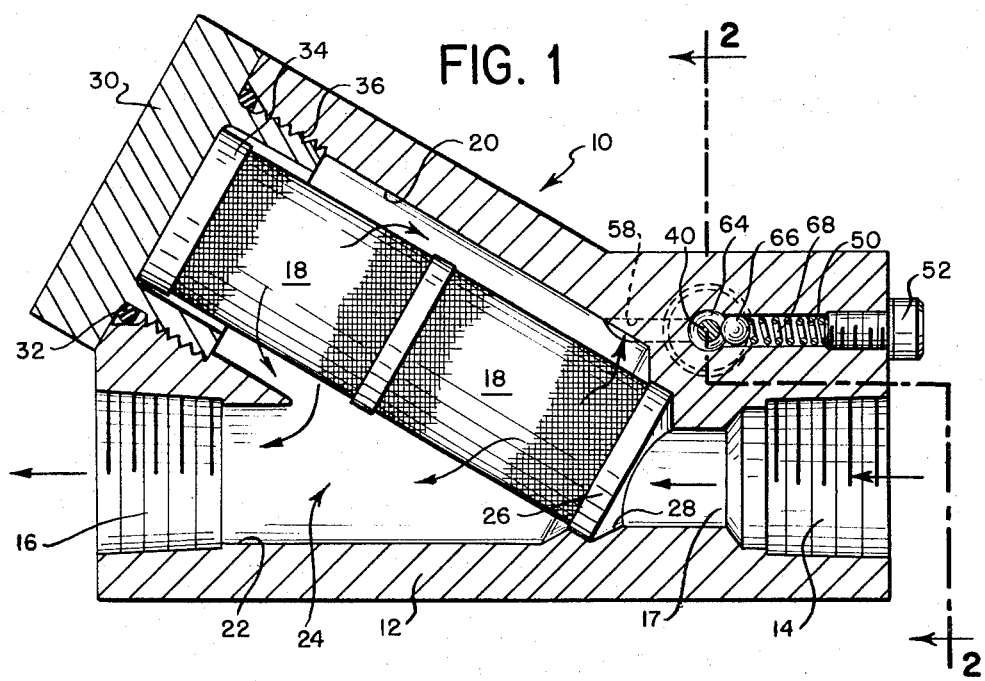
FIGURE 1 is a vertical cross-sectional view of a line strainer indicating device or apparatus constructed in accordance with the principles of the present invention, and taken along the line 1—1 of FIGURE 2.
Figure 2:
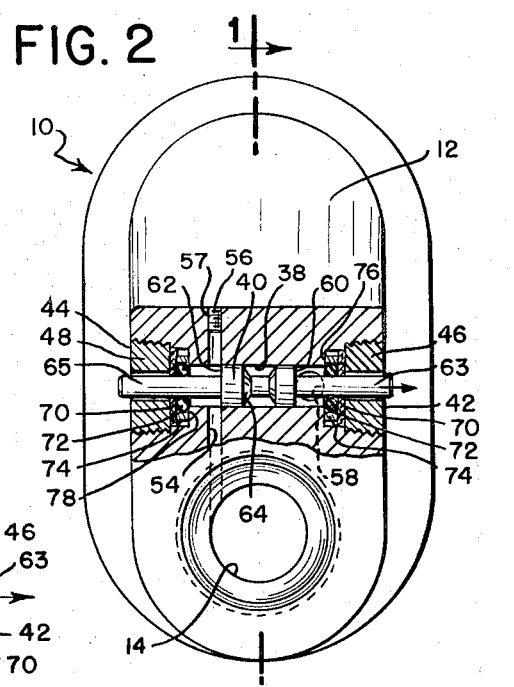
FIGURE 2 is a cross-sectional view taken along the line 2—2 of FIGURE 1, with parts being broken away to clearly illustrate certain details of construction.

With particular reference now to the drawing, and particularly to FIGURES 1 and 2, there is illustrated therein a line strainer indicating device or apparatus 10 constructed in accordance with the principles of the present invention, and being particularly adapted for use in alignment with a conduit system having conventional threaded pipe elements (not shown), enabling all of a fluid medium, such as oil, and the like, being translated or flowing through the conduit system to be filtered, and further enabling the presentation of a signal indicating the requirement for a new filter element, said device or apparatus comprising a pressure responsive assembly for detecting and visually indicating this need.

The line strainer indicating device or apparatus 10 comprises a housing or body 12 of generally Y-shaped configuration. The Y-shaped housing 12 is of hollow construction, and may be fabricated in any suitable manner and of any suitable material, such as iron, steel, and the like. There are provided substantially horizontal inlet and outlet passages or ports 14 and 16, respectively, through which a fluid medium, such as oil, and the like, is particularly adapted to be translated under pressure for filtering and straining. An inlet chamber 17 is provided adjacent the inlet port 14. The Y-shaped housing 12 further comprises a secondary passage 20 and a primary passageway 22. The secondary or auxiliary passageway 20 is particularly adapted to be disposed at an acute angle with respect to the primary passageway, thus enabling the presentation or formation of an outlet chamber 24 in the housing. A filter element 18, which may be of any suitable configuration, and, for example, is illustrated as being of cylindrical configuration, is particularly adapted to be removably disposed within the auxiliary passageway 20. The outlet chamber 24 is particularly adapted to be disposed in communication with the inlet port 14 through the medium of the filter element 18, and, to this end, one end 26 of the filter element is disposed or positioned within the mouth 28 of the inlet port.

A cover 30 particularly adapted to be disposed in threaded mutual cooperative engagement with the Y-shaped housing 12, thus enabling the auxiliary passageway 20 to be closed, and further enabling the filter element 18 to be maintained in position and alignment with and within the housing 12. The cover 30 comprises a suitable and conventional O-ring 32 for a purpose that is considered readily apparent to those skilled in the art, and, when run home with respect to the auxiliary passageway as through the medium of suitable threads 36, is particularly adapted to be disposed in a bearing mutual cooperative relationship with respect to another end 34 of the filter element.

The housing 12, at that end thereof adjacent the inlet port 14, comprises a generally horizontally disposed piston cylinder or chamber 38. A slidable piston or indicating rod 40 of generally cylindrical configuration is particularly adapted to be operatively associated with and within the cylinder or chamber 38. The chamber comprises open ends 42 and 44 that are particularly adapted to be enclosed by suitable annularly configured plugs 46 and 48 that are threadably mutually cooperatively engaged with threaded corresponding bores provided in the housing 12. The housing 12 further comprises another horizontal chamber or bore 50 that is disposed generally medially of the chamber 38, and is suitably closed by a threaded plug 52. The bore 50 is particularly adapted to lie in the same plane as the chamber 38, and, in addition, is positioned or disposed so as to intersect the chamber 38 at only one diametric location, as clearly illustrated in FIGURE 3.

The inlet port 14 is particularly adapted to be disposed in communication with the chamber 38, and to this end, there is provided a generally vertically disposed passage 54 that is positioned substantially adjacent one end of the chamber, and particularly that end enclosed by the plug 48. A plug 56 of any suitable construction threadably engages the passage 54 at one end 57 thereof, thus sealing the passage, and enabling the application of external atmospheric pressure thereto to be precluded. The other end of the chamber 38, that is, the end thereof adjacent the plug 46, is particularly adapted to be disposed in communication with the chamber 24, and to this end, there is provided a generally horizontally disposed passage 58.

The indicating rod or indicator assembly comprises pressure responsive surfaces 60 and 62 of planar generally annular configuration of substantially the same diametral dimensional extent as the chamber 38. Additionally, the rod 40 comprises a camming portion 64 defined by a generally medially disposed substantially annularly configured V-shaped groove, enabling the indicator element 40 to be translated from a normally disposed operating or non-indicating position, to an indicating or signalling position when the filter element 18 becomes clogged, as by contaminents, as hereinafter to bet described more fully. As just pointed out, the diametral dimensional extent of the pressure responsive surfaces 60 and 62 are substantially the same as that of the chamber 38, thus enabling the indicator element to be axially slidably supported within the chamber for reciprocal movements between the aforesaid non-indicating and indicating or signalling positions.

The indicator 40 comprises, still further, stem portions 63 and 65 of a lesser diametral dimensional extent than the pressure responsive surfaces 60 and 62, each of which stem portions are particularly adapted to extend through suitable apertures provided in a corresponding one of the plugs 46 and 48, thus enabling the indicator to be guided in its reciprocal axial translation within and with respect to the chamber 38.

The indicating device or apparatus 10 comprises, still further, a detent assembly having a spherical element 66 that is particularly adapted to be substantially continuously maintained in mutual cooperative engagement with the V-shaped camming portion 64. To this end, a suitable biasing element, such as a compression spring 68, is disposed within the bore 50, and is particularly adapted to exert a force against the spherical elements 66 tending to maintain that element within the camming portion 64 of the indicator 40. Accordingly, the indicator element 40 will be retained in its normal non-indicating position, the detent assembly precluding any tendency of the indicator to indavertently be reciprocally translated to another position as a result, for example, of minor variations or fluctuations in the pressure differential subsisting across the pressure responsive surfaces 60 and 62.

It is desirable that the prevailing ambient conditions prevailing externally of the chamber 38 be precluded from application thereto, and, to this end, the stem portion 63 and 65 of the indicator element 40 are provided with suitable back-up rings 70, O-rings 72, and seals 74 disposed thereabout. The elements 72, 74 and 76, which together may now be described as sealing assemblies, are disposed between a corresponding one of the plugs 46 and 48 are counterbored portions of the chamber 38. It is considered readily apparent, therefore, that any tendency of the indicator element to "wobble" will be substantially, if not completely, precluded, thus minimizing any requirement of close manufacturing tolerances.

Figure 3:
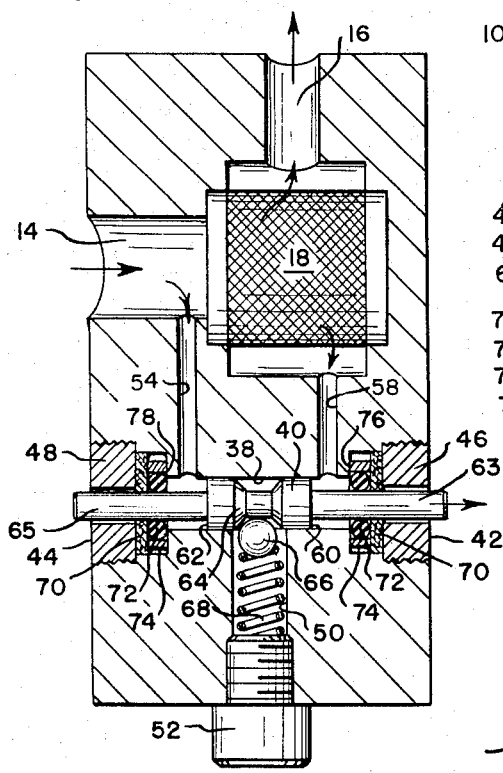
FIGURE 3 is a schematic cross-sectional view of the device or apparatus illustrated in FIGURES 1 and 2, showing the path of translation of a fluid medium particularly adapted to flow therethrough.

In the operation of the indicating device or apparatus 10, and with particular reference now to FIGURE 3 which schematically illustrates the flow of a fluid medium therethrough, the fluid medium to be filtered enters the housing 12 through the medium of the inlet passage or port 14, enters the inlet chamber 17, flows axially into the filter element 18, radially outwardly therefrom, and thence is discharged through the medium of the outlet port 16. The pressure of the fluid medium in the inlet chamber 17 is transmitted to the pressure responsive surface 62 of the indicator 40 through the medium of the passage 54. It will now be understood that this pressure is upstream pressure. Downstream fluid pressure is the pressure of the fluid medium after it has passed through the filter element 18, and is then transmitted to the pressure responsive surface 60 through the medium of the passage 58. Accordingly, a fluid pressure differential is applied to the indicator element 40. The pressure responsive surfaces 60 and 62 present substantially the same surface area, so that if the pressures applied to each surface were substantially equal, the pressure differential acting thereacross would be substantially zero, and there would be no tendency for the indicator to move from the non-indicating position illustrated in FIGURE 3, in which it is particularly adapted to be normally disposed.

However, there will be an inherent pressure drop between the fluid pressure at the inlet 14 to the housing 12, and the outlet 16 therefrom, as the fluid medium enters the housing, passes through the filter element 18, and exits therefrom. A positive pressure differential will therefore subsist across the indicator element 40, thus tending to cause its reciprocation from the non-indicating position hereinbefore described. It is considered readily apparent that the indicator element should be maintained in this normally disposed non-indicating position, notwithstanding any inherent pressure drop across the filter element 18, or any minor variations or fluctuations in the inlet or upstream pressure, or the outlet or downstream pressure, to thus preclude any false or inadvertent indication or signal that the filter element is clogged with contaminents. Accordingly, the force of the spring 68 is chosen so that the spherical element 66, which is disposed in camming mutual cooperative engagement with the camming portion 64, exerts a force against that portion sufficient to preclude such inadvertent or undesirable translation of the indicator element.

As the fluid medium to be filtered continues to pass through the filter element 18, small foreign particles and contaminants are blocked from their continued flow, and become trapped inside. Accordingly, the given area of the filter element through which the fluid medium must pass is reduced. As a result, fluid pressure in the inlet chamber 17 tends to increase, relative to the fluid pressure in the outlet chamber 24, thus increasing the pressure as applied to the pressure responsive surface 62, since the inlet chamber 17 is disposed in communication with this pressure responsive surface through the medium of the passage 54. It will be understood, therefore, that the pressure differential applied across the indicator element 40 tends to increase until this differential reaches a value causing a force to be applied to the spherical element 66 of the detent assembly sufficient to overcome the force applied thereto by the compression spring 68.

Once the holding force applied by the compression spring 68 of the detent assembly to the camming portion 64 through the medium of the spherical element 66 is overcome, the pressure differential across the indicator element 40 causes it to be reciprocally translated towards the right, as viewed in FIGURE 3, enabling the stem portion 63 of the indicator to extend outwardly of the housing 12. The extension or protrusion of this stem portion outwardly of the housing provides or presents a visual indication or signal that the pressure differential applied across the indicator element has increased to an extent sufficient to cause this result due to a clogging of the filter element 18. If desired, the stem portion 63 can be brightly painted or provided with other suitable indicia to enhance its utility as a visual gauge or indicator of a clogged filter condition. Alternatively, the indicator element 40 can be used as a trigger mechanism particularly adapted to cause the actuation of a switch or switching assembly (not shown), enabling the clogged condition of the filter element to be indicated at some remote location. Still further, the switch or switch assembly (not shown) can be operatively disposed within a system, so that upon its actuation by the stem portion 63, the system will be shut down or rendered inoperative of the aforesaid clogged condition. When this condition does prevail, the filter element can be replaced with extreme facility simply by removing the cover 30 and lifting the element 18 from within the housing 12.

As hereinbefore pointed out, the pressure differential at which the indicator element 40 is caused to be translated from its non-indicating position illustrated at FIGURE 3, to an indicating position, is a function of the holding force applied to the camming portion 64 by the compression spring 68. An indicating device or apparatus constructed in accordance with the principles of the present invention is particularly adapted to be utilized with various and even diverse types of fluid mediums, and, therefore, can be utilized with different types of filter elements. At this point, it will be understood that the varying pressure differentials at which each different filter element becomes clogged can be accommodated by simply changing the compression spring 68. This can be accomplished with extreme facility by simply removing the threaded plug 52.

It is noted, at this point, that any fluid pressure entering the camming portion 64 of the indicator element 40 will not tend to cause translation thereof because the oppositely disposed areas of the camming portion are of equal magnitude. Accordingly, pressures applied to the camming portion will be balanced. Therefore, and as hereinbefore pointed out, the need for close manufacturing tolerances is substantially minimized. The balanced design of the indicator element 40 is also significant in that the indicator device apparatus 10 will perform the same function and operate in substantially the same manner even though the flow of fluid medium therethrough is reversed. Thus, assuming that the inlet port 14 is an outlet port, and the outlet port 16 is an inlet, upstream fluid pressure will be applied to the pressure responsive surface 60 through the medium of the passage 58, and downstream fluid pressure will be applied to the pressure responsive surface 62 through the medium of the passage 54. The operation of the indicator element 40 is substantially the same as that described above, with the exception that, when the fluid pressure differential across the element 40 reaches a value sufficient to overcome the holding force applied by the compression spring 68, the indicator element will be caused to be translated to the left, as illustrated in FIGURE 3, enabling the stem portion 65 to function as the indicator portion. It may be desirable, therefore, to provide both stem portions 63 and 65 with suitable indicia. In either instance, when the filter element 18 does become clogged, the indicator element 40 will rapidly move to an indicating position, that is, the pressure differential will cause the indicator or element to "pop" or "snap" to a position in which it protrudes from the housing 12. This is true because the configuration of the element 66 is spherical, and the configuration of the camming portion 64 is bevelled or tapered. This is additionally true since those portions of the indicator element defining the pressure responsive surfaces 60 and 62, and the camming portions 64 are generally annular in one direction, and generally linear in another direction, thus presenting a substantially smooth surface along which the spherical element 66 may ride. Little concern need be attributed to the possibility of these portions "dropping" into the bore 50, since, as hereinbefore pointed out, the O-rings 72 guide the indicator element 40 and preclude any tendency of the same to wobble.

While the invention has been shown, illustrated, described and disclosed in terms of an embodiment or modification which it has assumed in practice, the scope of the invention should not be deemed to be limited by the precise embodiment or modification herein shown, illustrated, described or disclosed, such other embodiments or modifications intended to be reserved especially as they fall within the scope of the claims here appended.

What is claimed is:

1. A line strainer indicating apparatus for filtering various and even diverse types of fluid mediums comprising, in combination:

a housing of generally Y-shaped configuration having:

a primary passageway extending therethrough in alignment with substantially horizontally disposed inlet and outlet ports;

an auxiliary passageway intersecting said primary passageway;

a replaceable filter element removably disposed within said auxiliary passageway, and extending into said primary passageway at a location approaching said inlet port for filtering a fluid medium;

a removable cover threadably positioned upon said housing at an opened end of said auxiliary passageway for maintaining said filter element in position within said auxiliary passageway;

said primary passageway defining an inlet chamber disposed between said inlet and outlet ports, and said auxiliary passageway;

an open-ended transversely extending generally horizontally disposed bored chamber extending through said housing at a location adjacent said inlet port;

said bored chamber having counterbored ends of a greater diametral dimensional extent;

an indicator element slidably reciprocally translatably disposed within said bored chamber, said indicator element comprising:

oppositely disposed stem portions having:

a generally medially disposed annular camming groove of generally V-shaped configuration; and a plurality of oppositely disposed planar pressure responsive surfaces of generally annular configuration;

said oppositely disposed stem portions being of a lesser diametral dimensional extent than said pressure responsive surfaces, and said pressure responsive surfaces being of substantially the same diametral dimensional extent as said bored chamber;

a plurality of annularly configured plugs threadably disposed within the counterbored portions at the open ends of said bored chamber, and being disposed about the stem portions of said indicator element, enabling said element to be guided during slidable reciprocal translations within said bored chamber, and further enabling the preclusion of any tendency of said element to wobble;

a plurality of sealing assemblies positioned between said plugs and a corresponding one of said counterbored portions at each of the open ends of said bored chamber, enabling said bored chamber to be sealed from the application of atmospheric conditions thereto;

a detent assembly for maintaining said indicator element in a normally disposed non-indicating position, and comprising:

a generally horizontally disposed bore intersecting said bored chamber at one diametral location thereof, and being disposed generally in paralel relationship with respect to said inlet port;

a removable plug threadably connected to said housing at one end of said bore;

a spherical element disposed within said bore, and being particularly adapted to exert a force against said indicator element at the camming portion thereof; and a compression spring positioned between said plug and said spherical element, enabling the latter to be urged against said camming portion to preclude any inadvertent and undesirable slidable reciprocal translation of said indicator element from the aforesaid normally disposed non-indicating position;

a horizontal passageway extending between said inlet chamber and one of said pressure responsive surfaces, to provide communication therebetween, and enable the application of upstream fluid pressure thereto; and a vertical passageway extending between said outlet port and another of said pressure responsive surfaces, to provide communication therebetween, and enable the application of downstream fluid pressure thereto;

said horizontal and vertical passageways enabling the application of a fluid pressure differential across said indicator element at said pressure responsive surfaces, and said detent assembly applying a force to said indicator element at the camming portion thereof of a magnitude sufficient to overcome said differential pressure, and maintain said indicator element in the aforesaid normally disposed non-indicating position, not withstanding minor variations and fluctuations in said pressure differentials;

said fluid pressure differential, when the filter element becomes clogged with contaminants, overcoming the force applied to said indicator element at the camming portion thereof by the spherical element of said detent assembly, enabling said indicator element to be rapidly translated to an indicating position in which one of said stem portions extends outwardly of said housing and is visible externally thereof.

2. Line strainer indicating apparatus for filitering various and even diverse types of fluid mediums, comprising, in combination:

a housing having a primary passage extending therethrough and:

an inlet port and an outlet port therein enabling a flowing fluid medium to be translated therethrough;

a filter element extending at least partially into said primary passage and being disposed between said inlet port and said outlet port so that fluid flowing into said housing through said inlet port must pass through said filter element before exiting through said outlet port;

a generally horizontally disposed chamber;

a reciprocally translatable indicator element slidably disposed within said chamber, said indicator element having;

signalling portions for indicating a clogged condition of said filter element, further enabling a visual indication that said filter element requires repair or replacement;

a camming portion defining an annular groove; and a plurality of pressure responsive surfaces disposed on opposite sides of said groove;

a detent assembly for retaining said indicating element in a normally disposed non-indicating position, and comprising:

a bore intersecting said horizontal chamber;

a plug closing said bore at one end thereof;

a spherical element particularly adapted to be disposed in abutting mutual cooperative engagement with said indicator element at the camming portion thereof; and a biasing element positioned and extending between said plug and said spherical element, for urging the latter into its aforesaid relationship with respect to said camming portions;

a plurality of sealing assemblies for precluding the application of exterior ambient conditions to said chamber;

a first fluid passage providing communication between said inlet port and said horizontal chamber at a location substantially adjacent one of said pressure responsive surfaces; and a second fluid passage providing communication between said outlet port and said horizontal chamber at a location substantially adjacent another pressure responsive surface;

said first and second fluid passages applying a differential pressure across said indicator element which, when said filter element causes the filtration of a fluid medium flowing through said apparatus, is insufficient to overcome the force applied to said indicator element at the camming portion thereof by said detent assembly, and, when said filter element becomes clogged with the contaminants contained in the fluid medium to be filtered thereby, becomes sufficient to overcome the force applied by said detent assembly, enabling said indicating element to be rapidly translated to an indicating position in which said signalling portion protrudes outwardly of said housing, enabling the clogged condition of said filter element to be visually disconcernible from externally thereof.

3. Line strainer apparatus for causing the filtration of various and even diverse types of fluid mediums, comprising, in combination: a housing having an inlet port and an outlet port;

a primary passageway extending between said inlet port and said outlet port;

an auxiliary passageway disposed in acute angular relationship with respect to said primary passageway;

a filter element removably disposed within said auxiliary passageway, and extending to a position in said primary passageway adjacent sad inlet port so that a fluid medium entering said housing through said inlet port must flow through said filter element before exiting said housing through said outlet port;

a reciprocally translatable indicator element slidably disposed within a first chamber;

said indicator element having:

a camming portion defining a generally medially disposed annular groove;

a plurality of pressure responsive surfaces disposed on opposite sides of said groove;

a plurality of fluid passages communicating between said surfaces and said inlet and outlet ports for applying a pressure differential across said indicator element;

a detent assembly for retaining said indicator element in a normally disposed non-indicating position, and comprising:

a spherical element disposed in abutting mutual cooperative engagement with the camming portion of said indicating element; and a biasing element for urging said spherical element into engagement with the annular groove of said camming portion; and a plurality of sealing assemblies for precluding the application of external ambient conditions to the chamber in which said indicator element is slidably disposed;

said fluid pressure differential, when said filter element becomes clogged with contaminants, generating a force across said indicating element sufficient to overcome the force applied thereto by the spherical element of said detent assembly, enabling said indicating element to be rapidly translated to an indicating position in which a portion thereof protrudes from said housing and is visible externally thereof to signify a clogged condition of the filter element.

4. Line strainer apparatus as defined in claim 3 wherein:

said indicator element comprises:

at least one stem portion particularly adapted to extend outwardly of the housing when a clogged filter condition prevails;

said stem portion being guided as the indicating element is caused to reciprocate, enabling the preclusion of any tendency of the indicating element to wobble.

5. Line strainer apparatus for causing the filtration of various and even diverse types of fluid mediums, comprising, in combination:

a housing having:

an inlet port and an outlet port, and a primary passageway extending therebetween;

an enclosed auxiliary passageway having a filter element therein, said filter element extending from said auxiliary passageway into said primary passageway, at a location substantially adjacent said inlet port, causing a fluid being translated through said housing to flow through said filter element before it exits therefrom through said outlet port;

a chamber positioned adjacent said inlet port;

a reciprocally translatable indicating element slidably supported within said chamber, and having:

a generally medially disposed camming portion defining an annular groove; and oppositely disposed planar substantially annular pressure responsive surfaces;

a detent assembly for retaining said indicating element in a normally disposed non-indicating position, and comprising:

a spherical element disposed in abutting mutual cooperative engagement with the camming portion of said indicating element at the annular groove; and a biasing element disposed in abutting mutual cooperative engagement with said spherical element, for urging the latter into the aforesaid engagement with said indicating element at the camming portion thereof; and a plurality of fluid passages for applying a differential pressure comprising upstream pressure at the inlet port and downstream pressure at the outlet port across said indicating element at the pressure responsive surfaces thereof;

said differential pressure, when said filter becomes clogged with contaminants, increasing to generate a force of a magnitude sufficient to overcome the force applied by the spherical element of said detent assembly, enabling said indicating element to be rapidly translated to a position in which at least a portion thereof protrudes outwardly of the housing, further enabling said indicating element to present an exterior visible indication that said filter element is clogged.

References Cited
UNITED STATES PATENTS

| | | | |
|---|---|---|---|
| 2,125,532 | 8/1938 | Wells | 210—447 X |
| 2,861,690 | 11/1958 | Shaw et al. | 210—136 X |
| 2,935,040 | 5/1960 | Steensen | 210—90 X |
| 2,954,751 | 10/1960 | Barnes | 210—19 X |
| 2,979,021 | 4/1961 | Scavuzzo | 210—90 X |
| 3,028,009 | 4/1962 | Scavuzzo et al. | 210—90 |
| 3,052,206 | 9/1962 | Scavuzzo | 116—70 |

SAMIH N. ZAHARNA, *Primary Examiner.*